(12) United States Patent
Horning et al.

(10) Patent No.: US 8,727,249 B2
(45) Date of Patent: May 20, 2014

(54) ROLLER MILL FOR GRINDING PARTICULATE MATERIAL

(75) Inventors: Bent Horning, Hornbak (DK); Alexander Helm, Allerod (DK)

(73) Assignee: FLSmidth A/S, Valby (DK)

( * ) Notice: Subject to any disclaimer, the term of this patent is extended or adjusted under 35 U.S.C. 154(b) by 237 days.

(21) Appl. No.: 13/002,710

(22) PCT Filed: Jun. 1, 2009

(86) PCT No.: PCT/EP2009/056694
§ 371 (c)(1),
(2), (4) Date: Jan. 5, 2011

(87) PCT Pub. No.: WO2010/012527
PCT Pub. Date: Feb. 4, 2010

(65) Prior Publication Data

US 2011/0114768 A1    May 19, 2011

(30) Foreign Application Priority Data

Jul. 30, 2008   (DK) .................................. 2008 01048

(51) Int. Cl.
*B02C 23/00*    (2006.01)

(52) U.S. Cl.
USPC .......................................... 241/57; 241/119

(58) Field of Classification Search
USPC .......................................... 241/117–124, 57
See application file for complete search history.

(56) References Cited

U.S. PATENT DOCUMENTS 3,348,819 A * 10/1967 McIlvaine ........................ 366/13
3,730,446 A *  5/1973 Piepho ........................... 241/110
4,556,175 A * 12/1985 Motoyama et al. ............. 241/57

(Continued)

FOREIGN PATENT DOCUMENTS

DE        2061422 A1    6/1972
JP     2002370044 A    12/2002
WO   2009/007149 A1    1/2009

OTHER PUBLICATIONS

International Search Report for PCT/EP2009/056694 dated Sep. 16, 2009.

(Continued)

*Primary Examiner* — Faye Francis
*Assistant Examiner* — Chwen-Wei Su
(74) *Attorney, Agent, or Firm* — Buchanan Ingersoll & Rooney PC

(57) ABSTRACT

A roller mill for grinding particulate material such as for example cement raw materials, cement clinker and similar materials, said roller mill comprising a mill housing enclosing a grinding table and a set of rollers rotatable about a vertical shaft. The set of rollers are configured for interactive operation with the grinding table and comprising a number of rollers each rotating about a roller shaft which is connected to the vertical shaft via a hinged connection with a center of rotation which allows a free circular movement of the roller in upward and downward direction in a plane comprising the centerline of the roller shaft. The center of rotation of the hinged connection in a vertical plane is located under the centerline of the roller shaft. The grinding table is rotatable about the vertical shaft and the roller mill may include mechanisms or devices that are sized and configured to introduce gases into the mill housing and may also include mechanisms or devices configured to allow for continuously diverting ground material suspended in gases out of the mill housing.

19 Claims, 2 Drawing Sheets

(56) References Cited

U.S. PATENT DOCUMENTS

| | | | |
|---|---|---|---|
| 4,579,288 A * | 4/1986 | McDermid et al. | 241/39 |
| 5,667,149 A * | 9/1997 | Eisinger | 241/18 |
| 2009/0057450 A1* | 3/2009 | Euculano | 241/107 |

OTHER PUBLICATIONS

Written Opinion of the International Searching Authority of Application PCT/EP2009/056694.

* cited by examiner

ROLLER MILL FOR GRINDING PARTICULATE MATERIAL

CROSS-REFERENCE TO RELATED APPLICATIONS

This application is the United States national stage under 35 U.S.C. §371 of International Application No. PCT/EP2009/056694, filed on Jun. 1, 2009, claiming priority to Danish Application No. PA 2008 01048, filed on Jul. 30, 2008. Both of those applications are incorporated by reference herein.

FIELD OF INVENTION

The present invention relates to a roller mill for grinding particulate material such as for example cement raw materials, cement clinker and similar materials, said roller mill comprising a mill housing enclosing a grinding table and a set of rollers rotatable about a vertical shaft, said set of rollers being configured for interactive operation with the grinding table and comprising a number of rollers each rotating about a roller shaft which is connected to the vertical shaft via a hinged connection with a center of rotation which allows a free circular movement of the roller in upward and downward direction in a plane comprising the centerline of the roller shaft, with said center of rotation of the hinged connection in a vertical plane being located under the centerline of the roller shaft.

BACKGROUND OF THE INVENTION

German Patent Application No. DE 2061422 A1 discloses a mixing machine. This mixing machine comprises a stationary mixing table and a number of rollers configured for interactive operation with the mixing table. Each roller rotates about a separate roller shaft, which is connected to a vertical shaft via a hinged connection. The center of rotation for the hinged connection allows a free circular movement of the roller in upward and downward direction in a plane comprising the centerline of the roller shaft. The center of rotation of the hinged connection is located under the horizontal centerline of the roller shaft. In this way the centrifugal force, which during the operation of the mill acts upon the roller, will produce a turning moment around the hinge and hence a force directed downward against the grinding table. This mixing machine is used in foundries for mixing water, sand and binding materials to a viscous mass of molding sand. The mixing table is formed with walls so as to form a bowl to prevent water to escape from the mixing process. This process is not continuous since the mixing machine has to be stopped and the viscous mass of finished molding sand has to be removed before a new batch of water, sand and binding materials can be fed to the machine. Such stops causing considerable down-time of the machine are expensive in terms of time and furthermore it is a labour-intensive task to remove the finished molding sand.

SUMMARY OF THE INVENTION

It is the objective of the present invention to provide a roller mill with a continuous operation in order to eliminate the aforementioned disadvantages.

This is obtained by means of a roller mill of the kind mentioned in the introduction and being characterized in that the grinding table is rotatable about the vertical shaft and in that the roller mill comprises means for introducing gases into the mill housing and means allowing for continuously diverting ground material suspended in gases out of the mill housing.

It is hereby obtained that the grinding process is made continuously as the material fed to the grinding table is transported across the grinding table, by means of the centrifugal forces to which the material is subjected due to the rotation of the grinding table, to the rollers where it is ground and subsequently suspended in the gas introduced in the mill housing, whereafter the ground material in suspended form is diverted through an outlet connected to the mill housing.

The means for introducing gases into the mill housing for continuous diversion, through an outlet, of ground material suspended in gases may in principle be constituted by any suitable means. The means may be positioned at any location in the mill as long as they will ensure that gases are introduced in appropriate manner. The nozzles may be positioned horizontally in the wall of the mill housing, immediately above the grinding table so that they allow the gases to be introduced radially relative to the grinding table. One or more of the nozzles may be movably mounted to allow the angle relative to the horizontal grinding table to be altered. Hence it will be possible to adjust the nozzles in order to optimize the efficiency of the gases introduced. The means for introducing gases into the mill housing may further comprise a number of vertical louvers being movably arranged around the grinding table so that the introduction of the gases can be controlled by adjusting the angles of the louvers. The ground material suspended in gases may be extracted through an outlet connected to the upper part of the mill housing by means of a fan.

In another embodiment the means for introducing gases into the mill housing comprises a number of nozzles arranged in a nozzle ring enclosing the grinding table allowing the gases to be introduced around the edge of the grinding table.

In a further embodiment the means for introducing gases into the mill housing comprises two or more separate feed systems each comprising means such as a fan for introducing gases into the mill housing. One system could be capable of introducing gases through a nozzle ring enclosing the grinding table, whereas the second system could be capable of introducing gases through nozzles which are mounted in the mill housing. Hence it is possible to introduce the atmospheric air surrounding the roller mill through one system and hot gases through the second system or conversely. To ensure energy efficiency, it would be advantageous to distribute the gas flow into a cold flow which is blown into the roller mill and into a hot flow which is sucked into the roller mill by a fan at a relatively low pressure loss. Furthermore, some of the gases being introduced into the mill housing should advantageously be made up of atmospheric air since this would lessen the requirements imposed upon the materials and components of the feed system as compared to a feed system for introducing hot gases. The relationship between the quantity of hot gases and air, respectively, must be optimized relative to the process in the mill in order to minimize the energy consumption for the grinding process and the airflow process. For all types of nozzles, the gases can either be blown or sucked through the nozzles. Atmospheric air for one feed system may, for example, be introduced by blowing the air up through a nozzle ring around the grinding table using a fan while hot gases for the second feed system may be introduced by sucking the gases through nozzles in the mill housing by means of a second fan which is connected to the outlet at the top of the mill housing. The converse situation with hot gases through the nozzle ring and atmospheric air through the nozzles in the mill housing or an embodiment with hot gases in both feed systems would also be applicable.

All the mentioned means for introducing gases in the mill housing can be combined with each other in order to achieve an optimum gas flow in the mill housing.

In order to attain a high a speed of rolling, defined as the relative speed between the rollers and the grinding table, and hence a high capacity of the mill, it is preferred that the set of rollers and the grinding table are turned in opposite directions.

For smaller mills the speed of rotation of the rollers must exceed that applied in bigger mills in order to achieve a desired pressure contribution from the centrifugal force which during the operation of the mill acts upon the roller and produces a turning moment around the hinge and hence a force directed downward against the grinding table. Furthermore the grinding table must have a certain speed of rotation to enable the centrifugal force to transport the material towards its peripheral edge. Therefore the speed of rolling in small mills may become so high as to involve operational problems in terms of vibrations and similar occurrences. In small mills, it is therefore preferred that the rollers and the grinding table are turned in the same direction.

Other details, objects, and advantages of the invention will become apparent as the following description of certain present preferred embodiments thereof and certain present preferred methods of practicing the same proceeds.

BRIEF DESCRIPTION OF THE DRAWINGS

Embodiments of the invention will now be described in further details with reference to the drawings being diagrammatical, and where.

DETAILED DESCRIPTION OF PRESENT PREFERRED EMBODIMENTS

Figure 1:
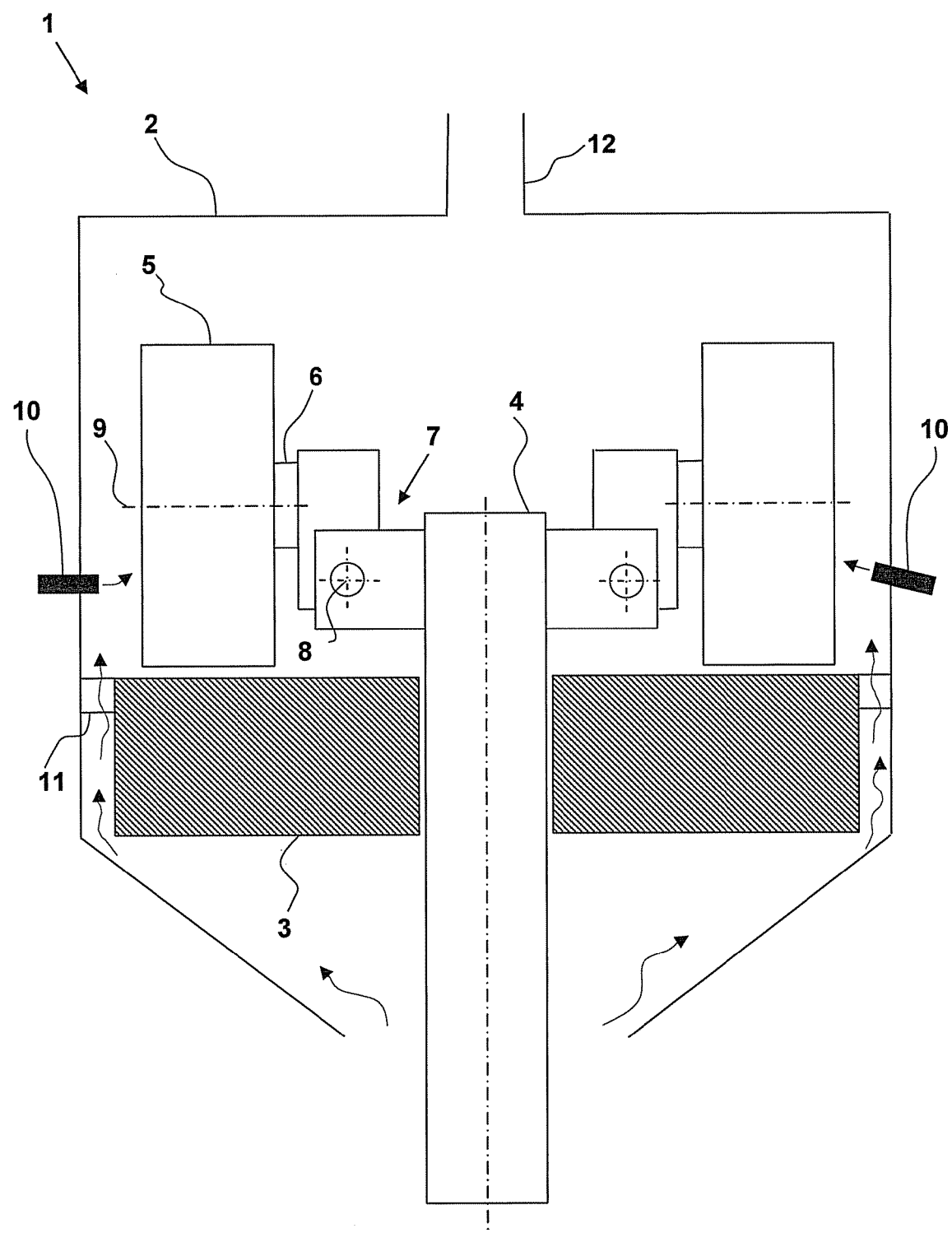
FIG. 1 shows a sectional view of a roller mill according to the invention.

In FIG. 1 is seen a sectional view of a roller mill 1 which comprises a horizontal grinding table 3 whereto raw material to be ground through an inlet (not shown) is continuously fed, and a set of rollers comprising a number of rollers 5 operating interactively therewith, with the set of rollers being connected to and turning about a vertical shaft 4. The rollers 5 turn about separate roller shafts 6 which are connected to the vertical shaft 4 via a hinged connection 7 which allows the rollers 5, when turning about this connection, to move freely up and down in a plane which comprises the centerline 9 of the roller shaft 6. According to the invention the center 8 of rotation of the hinged connection 7, viewed in a vertical plane, is located under the centerline 9 of the roller shaft 6. As a result, the centrifugal force which during the operation of the mill acts upon the rollers 5, the roller shafts 6 and the upper part of the hinged connections 7 will produce a turning moment about the hinged connection 7 and hence a downwardly directed force which contributes to the grinding pressure of the rollers 5 against the grinding table 3.

Nozzles 10 for introducing gases are mounted in the wall of the mill housing 2. The nozzles 10 can be positioned horizontally in the mill housing above the grinding table, thereby introducing gases into the mill housing 2 radially relative to the grinding table 3, or be movably mounted so that the angle relative to the horizontal grinding table 3 can be altered. Furthermore a number of nozzles are arranged in a nozzle ring 11 enclosing the grinding table allowing the gases to be introduced around the edge of the grinding table. The ground material suspended in the introduced gases is extracted by a fan through an outlet 12 in the upper part of the mill housing 2.

Figure 2:
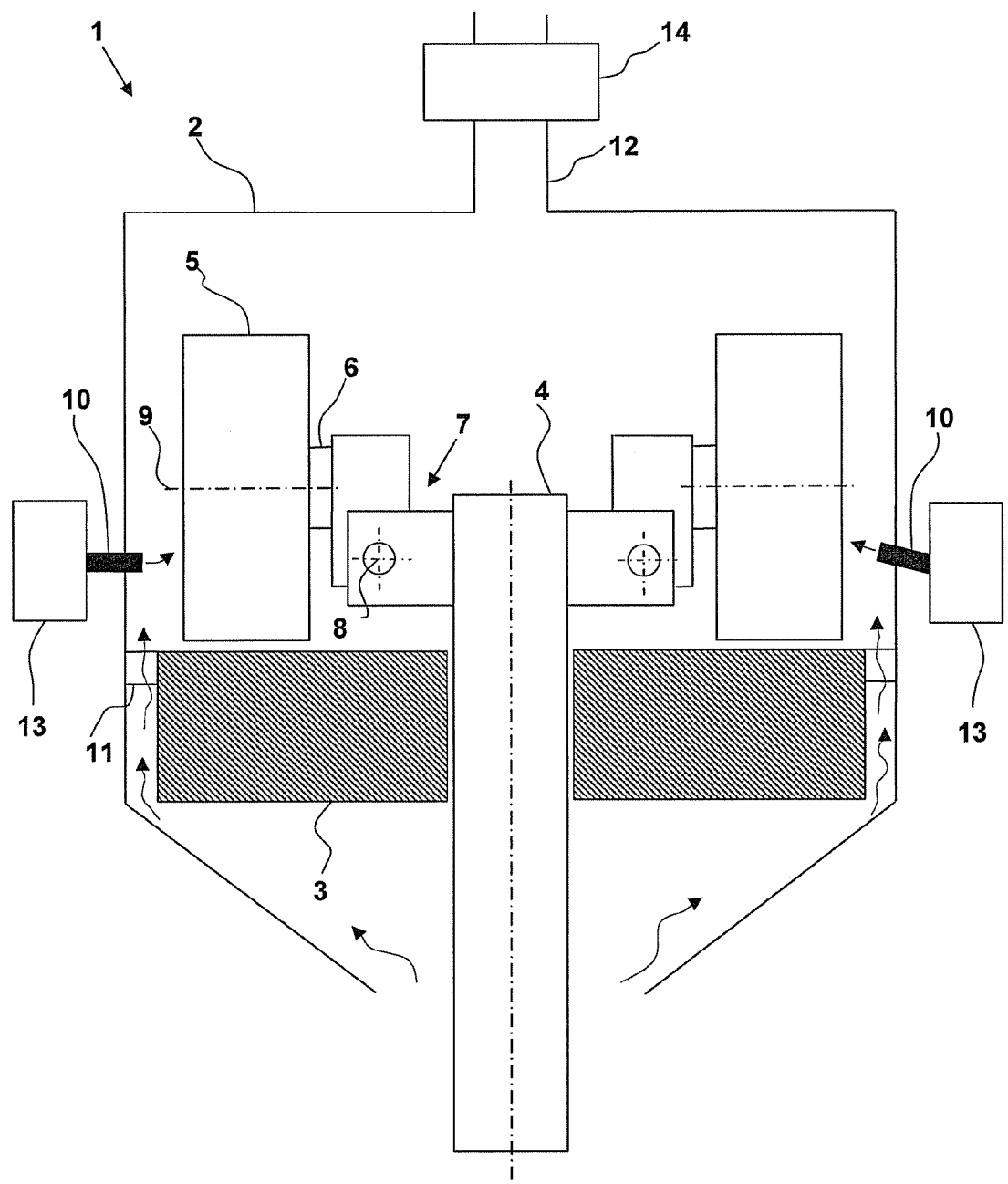
FIG. 2 shows a sectional view of another embodiment of a roller mill according to the invention.

FIG. 2 shows a sectional view of an embodiment of the invention where the roller mill 1 comprises two separate feed systems for introducing gases into the mill housing 2. The first system introduces gases through the nozzle ring 11 enclosing the grinding table 3, whereas the second system introduces gases through the nozzles 10 mounted in the mill housing 2. Hence it is possible to introduce hot gases through the first system and the atmospheric air surrounding the roller mill through the second system. A fan 14 in the first feed system, placed after the outlet 12, sucks hot gases through the nozzle ring 11, whereas a fan 13 in the second feed system blows atmospheric air through the nozzles 10 which are mounted in the wall of the mill housing 2. The converse situation with hot gases through the nozzles 10 in the mill housing and atmospheric air through the nozzle ring 11 or an embodiment with hot gases in both feed systems would also be applicable.

The grinding table 3 is turned at a certain speed of rotation in order to move the material across the grinding table 3 towards its peripheral edge by means of the centrifugal force. In order to attain a high speed of rolling, defined as the relative speed between the rollers 5 and the grinding table 3, and hence a high capacity of the mill, it is preferred that the set of rollers and the grinding table 3 are turned in opposite directions. For smaller mills the speed of rotation of the roller set must, however, exceed that applied in bigger mills in order to achieve the desired grinding pressure. For avoidance of operational problems in terms of vibrations and similar occurrences in case of excessive speeds of rolling, it is therefore preferred that the set of rollers and the grinding table 3 are turned in the same direction in small mills.

It should be appreciated that the roller mill 1 permits a grinding process to be performed continuously as the material fed to the grinding table 3 is transported across the grinding table 3. The material may be subjected to centrifugal forces due to the rotation of the grinding table 3 and the rotation of the rollers 5 where the material is ground. The material may subsequently be suspended in the gas introduced in the mill housing, whereafter the ground material in suspended form is diverted through an outlet connected to the mill housing 2.

While certain present preferred embodiments of the roller mill and certain embodiments of methods of practicing the same have been shown and described, it is to be distinctly understood that the invention is not limited thereto but may be otherwise variously embodied and practiced within the scope of the following claims.

The invention claimed is:

1. A roller mill comprising:
a mill housing enclosing a grinding table and a set of rollers rotatable about a vertical shaft;
said set of rollers being configured for interactive operation with the grinding table and comprising a number of rollers, each roller of the set of rollers rotating about a roller shaft which is connected to the vertical shaft via a hinged connection with a center of rotation that allows a circular movement of the roller in upward and downward directions in a plane comprising a centerline of the roller shaft;
the center of rotation of the hinged connection being in a vertical plane located under the centerline of the roller shaft;
the grinding table being rotatable about the vertical shaft;
a plurality of gas flow devices sized and configured to introduce at least one gas into the mill housing; and at least one material diverting mechanism that continuously diverts material ground by the rollers of the set of rollers and suspended in the at least one gas out of the mill housing, the at least one material diverting mechanism comprising an outlet of the mill housing such that material is subjected to centrifugal forces due to rotation of the grinding table and rotation of the rollers so that the material is subsequently suspended in the at least one gas for diversion out of the outlet; and wherein the gas flow devices comprise two or more separate feed systems each comprising at least one fan to introduce the at least one gas into the mill housing; and wherein the at least two feed systems are comprised of a first feed system and a second feed system, and wherein the first feed system comprises at least one nozzle mounted in a wall of the mill housing to divert the ground material suspended in the at least one gas through the outlet of the mill housing and the second feed system comprises a number of nozzles arranged in a nozzle ring enclosing the grinding table that emit the at least one gas to move the ground material suspended in the at least one gas through the outlet; and wherein the at least one gas emitted by the nozzles arranged in the nozzle ring is cooler than the at least one gas emitted by the at least one nozzle mounted in the wall of the mill housing.

2. The roller mill according to claim 1 wherein the gas flow devices comprise a number of nozzles mounted in a wall of the mill housing.

3. The roller mill according to claim 2 wherein at least one of the nozzles are movably mounted to the wall.

4. The roller mill according to claim 1 wherein the grinding table has a peripheral edge and the gas flow devices comprise a plurality of nozzles arranged in a nozzle ring enclosing the grinding table to allow the at least one gas to be introduced around the peripheral edge of the grinding table.

5. The roller mill according to claim 1 wherein the gas flow devices comprise a plurality of vertical louvers being movably arranged around the grinding table.

6. The roller mill according to claim 1 wherein the set of rollers and the grinding table are turned in opposite directions.

7. The roller mill according to claim 1 wherein the set of rollers are turned in a first direction and the grinding table is also turned in the first direction.

8. The roller mill of claim 7 wherein the first direction is clockwise or counter clockwise and wherein the at least one gas is comprised of at least one of air and a heated gas.

9. A roller mill comprising:
a grinding table, the grinding table rotatable in a first direction;
a set of rollers;
a mill housing enclosing the rollers and grinding table;
a vertical shaft connected to the rollers for rotating the rollers above the grinding table in a second direction;
each roller of the set of rollers rotatable about a respective roller shaft connected to the vertical shaft to grind material, each respective roller shaft connected to the vertical shaft via a hinged connection such that the roller rotating about that respective roller shaft is moveable in an upward direction and in a downward direction in a plane comprising a centerline of that respective roller shaft and wherein a center of rotation of the hinged connection being in a vertical plane located under the centerline of that respective roller shaft;

gas flow mechanisms connected to the mill housing to introduce at least one gas into the mill housing;

at least one gas flow device connected to the mill housing to divert material ground by the rollers of the set of rollers and that is suspended in at least one gas in the mill housing such that the suspended material is moveable out of the mill housing; and a first feed system and a second feed system, the first feed system comprising at least one fan and the second feed system comprising at least one fan, the at least one fan of the first feed system connected to the gas flow mechanisms and the at least one fan of the second feed system connected to the at least one gas flow device; and wherein the at least one fan of the second feed system moves the at least one gas through the at least one gas flow device such that the suspended material is diverted through an outlet of the roller mill, the material being diverted after the material is subjected to centrifugal forces from rotation of the grinding table and rotation of the rollers and is subsequently suspended in gas within the housing for diversion out of the roller mill via the outlet; and wherein the at least one gas emitted via the gas flow mechanisms is cooler than the at least one gas emitted via the at least one gas flow device.

10. The roller mill of claim 9 wherein the gas flow mechanisms are comprised of nozzles mounted adjacent to a wall of the mill housing.

11. The roller mill of claim 10 wherein at least one of the nozzles is moveably mounted to the wall.

12. The roller mill of claim 10 wherein the gas flow mechanisms are also comprised of nozzles that are arranged in a nozzle ring that enclose the grinding table and allow the at least one gas to be introduced adjacent to an edge of the grinding table.

13. The roller mill of claim 12 wherein the gas flow mechanisms are also comprised of louvers moveably arranged around the grinding table.

14. The roller mill of claim 9 wherein the gas flow mechanisms are comprised of nozzles that are arranged in a nozzle ring that enclose the grinding table and allow the at least one gas to be introduced adjacent to an edge of the grinding table.

15. The roller mill of claim 9 wherein the gas flow mechanisms are also comprised of louvers moveably arranged around the grinding table.

16. The roller mill of claim 9 wherein the first direction and the second direction are a same direction or wherein the first direction is a different direction than the second direction.

17. The roller mill of claim 9 wherein the at least one gas flow device is comprised of the outlet, the outlet being attached to the mill housing.

18. The roller mill of claim 9 wherein the at least one fan of the second feed system pushes or sucks the at least one gas through the at least one gas flow device to move the at least one gas such that the suspended material is diverted through the outlet of the roller mill.

19. The roller mill of claim 9 wherein the at least one gas introduced into the mill housing via the gas flow mechanisms suspend the ground material in the at least one gas for being diverted via the at least one gas flow device out of the mill housing through the outlet.

* * * * *